*(12)* United States Patent
Yoon et al.

(10) Patent No.: US 7,668,338 B2
(45) Date of Patent: Feb. 23, 2010

(54) PERSON TRACKING METHOD AND APPARATUS USING ROBOT

(75) Inventors: Sangmin Yoon, Yongin-si (KR); Changkyu Choi, Seoul (KR); Hyoungki Lee, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 637 days.

(21) Appl. No.: 11/207,713

(22) Filed: Aug. 22, 2005

(65) Prior Publication Data

US 2006/0039587 A1   Feb. 23, 2006

(30) Foreign Application Priority Data

Aug. 23, 2004   (KR)   ...................... 10-2004-0066396

(51) Int. Cl.
*G06K 9/00*   (2006.01)
(52) U.S. Cl. ..................................................... 382/103
(58) Field of Classification Search ......... 382/115–134, 382/103, 181, 190, 201, 209, 210; 348/169–172; 340/5.1–5.92
See application file for complete search history.

(56) References Cited

U.S. PATENT DOCUMENTS

| 5,430,809 | A * | 7/1995 | Tomitaka | 382/173 |
|---|---|---|---|---|
| 6,611,613 | B1 * | 8/2003 | Kang et al. | 382/118 |
| 6,999,606 | B1 * | 2/2006 | Frischholz | 382/118 |
| 7,120,279 | B2 * | 10/2006 | Chen et al. | 382/118 |
| 2004/0017930 | A1 * | 1/2004 | Kim et al. | 382/103 |
| 2005/0063568 | A1 * | 3/2005 | Sun et al. | 382/117 |
| 2006/0104487 | A1 * | 5/2006 | Porter et al. | 382/118 |
| 2006/0285723 | A1 * | 12/2006 | Morellas et al. | 382/103 |

FOREIGN PATENT DOCUMENTS

| JP | 2000-105835 | 4/2000 |
|---|---|---|
| KR | 1999-0070243 | 9/1999 |

OTHER PUBLICATIONS

The Gaussian Particle Filter for Diagnosis of Non-Linear Systems, Fred Hutter et al., 5$^{th}$ IFAC Symposium on Fault Detection, Supervision and Safety of Technical Processes (SAFEPROCESS 2003), vol. 3, Jan. 1, 2003.

* cited by examiner

*Primary Examiner*—Samir A. Ahmed
*Assistant Examiner*—Atiba O Fitzpatrick
(74) *Attorney, Agent, or Firm*—Staas & Halsey LLP (57) ABSTRACT

A person tracking method and apparatus using a robot. The person tracking method includes: detecting a person in a first window of a current input image using a skin color of the person; and setting a plurality of second windows in a next input image, correlating the first window and the second windows and tracking the detected person in the next input image using the correlated results.

18 Claims, 9 Drawing Sheets

PERSON TRACKING METHOD AND APPARATUS USING ROBOT

CROSS-REFERENCE TO RELATED APPLICATION

This application claims the benefit of Korean Patent Application No. 2004-0066396, filed on Aug. 23, 2004, in the Korean Intellectual Property Office, the disclosure of which is incorporated herein by reference.

BACKGROUND OF THE INVENTION

1. Field of the Invention

The present invention relates to a person tracking method and apparatus using a robot, and more particularly to a method and an apparatus for detecting a person from an input image and tracking the motion of the detected person using a robot.

2. Description of Related Art

Recently, a robot has been spotlighted as a system to replace humans for simple tasks in a home or in a place hard to access in person. Currently, the function of the robot is only to perform simple repeated tasks. A prerequisite for performing more intelligent works is an interaction with the person who employs the robot. For smooth interaction, the robot needs to be able to locate and track the user so that it stays in the vicinity of the user.

One way a robot can locate and track a user is by face detection. Most existing face detecting devices locate a person indoors or outdoors using a method of storing a background image and then detecting motion of the person using a difference image obtained by subtracting the background image from the input image, or a method of tracking the location of the person using only shape information. The method using the difference image between the input image and the background image is very efficient in a case of using a fixed camera, but not for a continuously moving camera arranged in a robot, because the background image continuously changes. On the other hand, the method using the shape information of the person takes a long time to locate the person by matching a plurality of model images, similar to a person shape, to the whole input image.

BRIEF SUMMARY

An aspect of the present invention provides a method and apparatus for detecting a person using a skin color from an input image and tracking the detected person.

According to an aspect of the present invention, there is provided a person tracking method including detecting a person in a first window of a current input image using a skin color of the person; and setting a plurality of second windows in a next input image, correlating the first window and the second windows and tracking the detected person in the next input image using the correlated results.

According to another aspect of the present invention, there is provided a person tracking apparatus including: an image input unit which outputs continuous images; a person detecting unit which detects a person from a current input image in a first window using a skin color of the person; and a tracking unit which sets a plurality of second windows in a next input image following the current input image, correlates the first window and the second windows and tracks the detected person in the next input image using the correlated results.

According to another aspect of the present invention, there is provided a computer-readable storage medium encoded with processing instructions for causing a processor to perform a person tracking method including: detecting a person in a first window of a current input image using a skin color of the person; and setting a plurality of second windows in a next input image, correlating the first window and the second windows and tracking the detected person in the next input image using the correlated results.

According to another aspect of the present invention, there is provided a robot, including: an image input unit receiving an image and outputting a captured image; a person detecting unit detecting a person in the captured image using a skin color of the person; a tracking object determining unit selecting a detected person in the captured image as a tracking object; and a tracking unit moving the robot a location near the observation object and tracking the observation object at the location.

Additional and/or other aspects and advantages of the present invention will be set forth in part in the description which follows and, in part, will be obvious from the description, or may be learned by practice of the invention

BRIEF DESCRIPTION OF THE DRAWINGS

The above and/or other aspects and advantages of the present invention will become apparent and more readily appreciated from the following detailed description, taken in conjunction with the accompanying drawings of which.

DETAILED DESCRIPTION OF EMBODIMENTS

Reference will now be made in detail to embodiments of the present invention, examples of which are illustrated in the accompanying drawings, wherein like reference numerals refer to the like elements throughout. The embodiments are described below in order to explain the present invention by referring to the figures.

Figure 1:
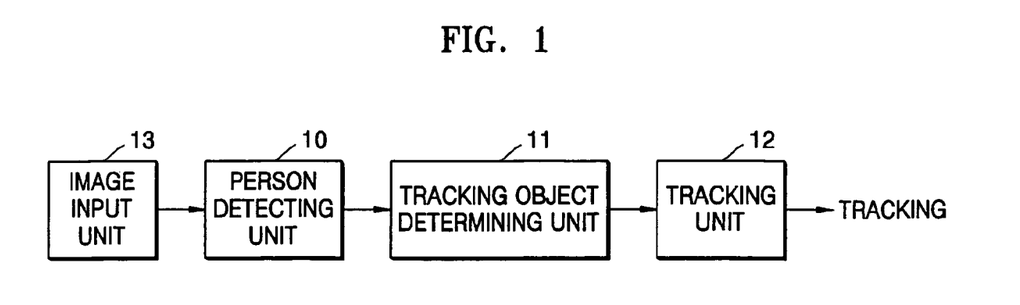
FIG. 1 is a block diagram of a person tracking apparatus according to an embodiment of the present invention.

FIG. 1 is a block diagram of a person tracking apparatus according to an embodiment of the present invention. The person tracking apparatus includes an image input unit 13, a person detecting unit 10, a tracking object determining unit 11 and a tracking unit 12.

The image input unit 13 outputs an image captured by a photographing arrangement (not shown), and can be any type of camera which can photograph a moving person. The person detecting unit 10 detects the person using a skin color of the person from the image input from the image input unit 13. When multiple persons are detected in the person detecting unit 10, the tracking object determining unit 11 determines (i.e., selects) one of the detected persons, for example, a detected person who is the nearest to the centroid of the detected persons in the image as a tracking object. If the tracking object is determined, the robot approaches to a certain distance from the tracking object using the location and distance information of the tracking object.

Figure 2:
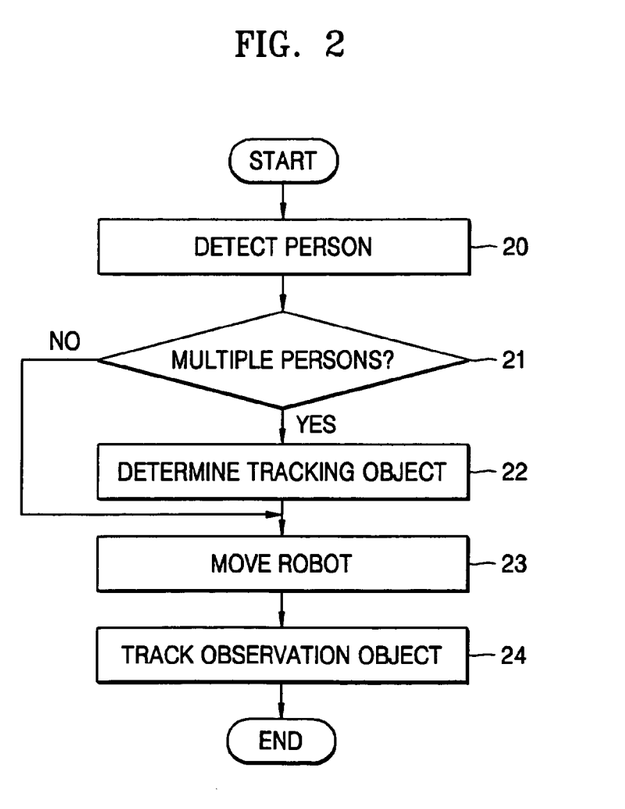
FIG. 2 is a flowchart illustrating a person tracking method according to an embodiment of the present invention.

The operation of the person tracking apparatus illustrated in FIG. 1 will now be described in detail with reference to the flowchart in FIG. 2.

Figure 3:
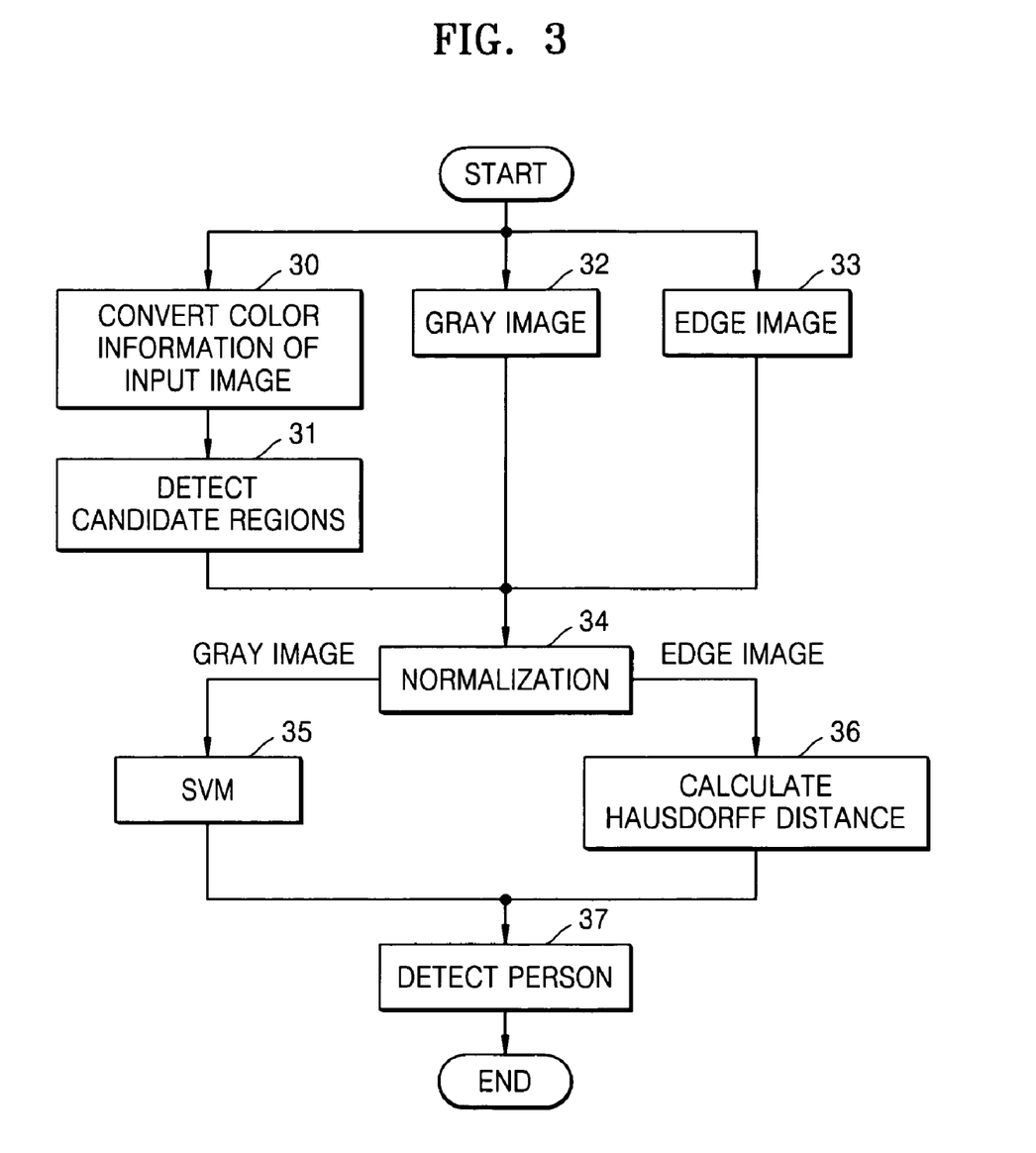
FIG. 3 is a detailed flowchart illustrating a person detecting operation.

First, the person detecting unit 10 detects the person from the input image (operation 20). FIG. 3 is a detailed flowchart illustrating the person detecting operation 20. Referring to FIG. 3, first, color information of the input image is converted (operation 30). The color information conversion is to reduce the effect of the illumination included in the input image and emphasize skin color regions. RGB (Red, Green, and Blue) colors of the input image are converted into a normalized rgb domain as shown by equation (1).

$$r = \frac{R}{R+G+B}, g = \frac{G}{R+G+B}, b = \frac{B}{R+G+B} \quad (1)$$

Figure 4A:
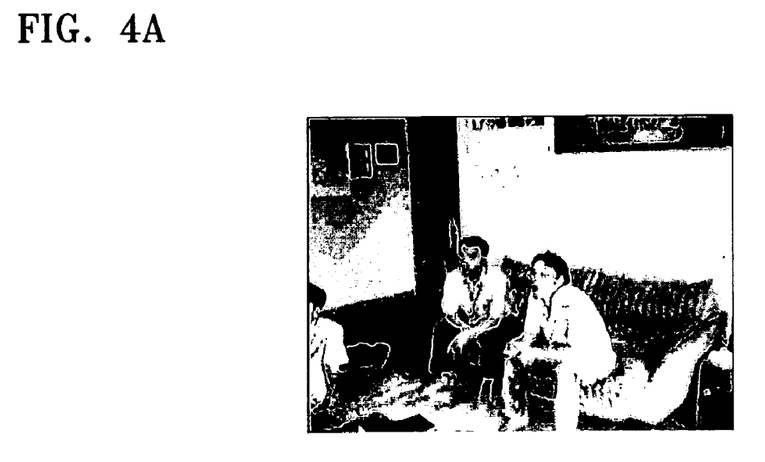
FIG. 4A illustrates an input image and FIG. 4B illustrates the image with RGB colors normalized.
Figure 4B:
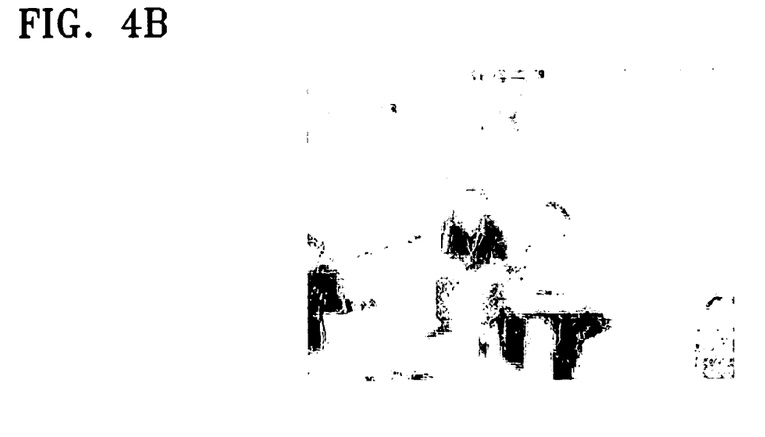

FIG. 4A illustrates an input image and FIG. 4B illustrates the input image with RGB colors normalized.

Next, Gaussian modeling is performed as shown by equation (2) on an rgb image using averages ($m_r$, $m_g$) of colors r and g and standard deviations ($\sigma_r$, $\sigma_g$) of a plurality of skin color models. Regions where the modeled values are greater than a specified threshold value, for example 240, are detected as candidate regions for the skin color (operation 31).

$$Z(x, y) = G(r(x, y), g(x, y)) \quad (2)$$
$$= \frac{1}{2\pi\sigma_r\sigma_g} \exp\left[-\frac{1}{2}\left\{\left(\frac{r(x,y)-m_r}{\sigma_r}\right)^2 + \left(\frac{g(x,y)-m_g}{\sigma_g}\right)^2\right\}\right]$$

Figure 4C:
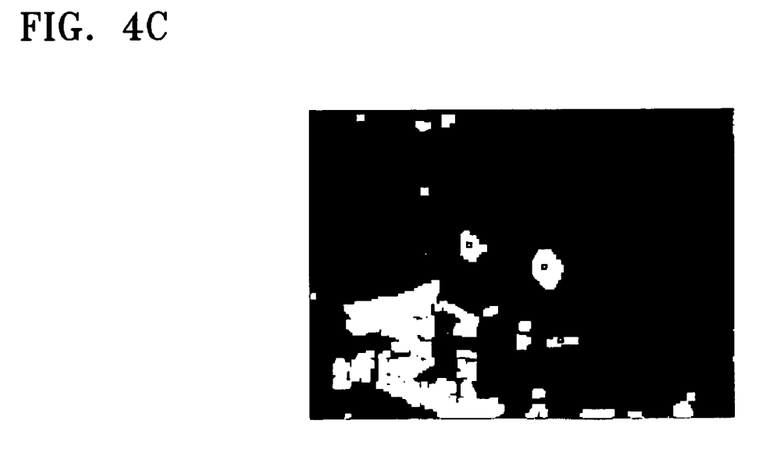
FIG. 4C illustrates regions that are detected as candidate regions from the input image.

FIG. 4C illustrates regions that are detected as candidate regions from the input image. The image is binarized so that the candidate regions are expressed by white and other regions are expressed by black.

In operations 32 and 33, a gray image and an edge image for the input image are obtained, respectively. The edge image can be obtained by the Sobel edge detecting method or the Canny edge detecting method.

The regions corresponding to the candidate regions detected in operation 31 are extracted from the gray image and the edge image, and are normalized using the centroid and size information of the candidate regions (operation 34).

Figure 5A:
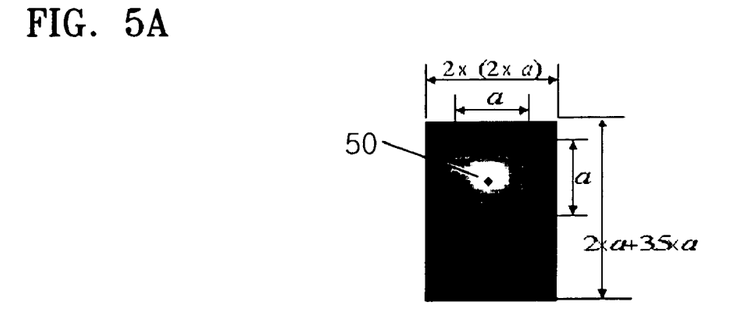
FIG. 5A illustrates an example of the first normalization for a candidate region on the basis of the centroid of the candidate region.

FIG. 5A illustrates an example of the first normalization for a candidate region on the basis of a centroid 50 of the candidate region. Each candidate region is normalized so that its height is greater than its width after obtaining a square of size of axa centered around the centroid 50. For example, the candidate region is normalized by (2×a) respectively in left and right sides from the centroide 50, totally 2×(2×a) in width, and (2×a) upward and (3.5×a) downward from the centroid 50, totally 2×a+3.5×a in height. Here, a may be the square root of the size information, that is, $\sqrt{\text{size}}$.

Figure 5B:
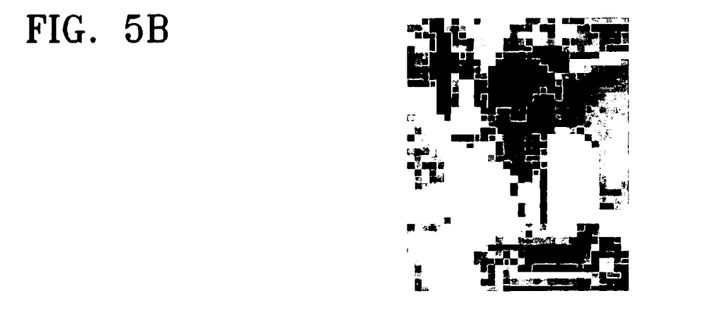
FIGS. 5B, 5C and 5D illustrate examples of the normalized input images.
Figure 5C:
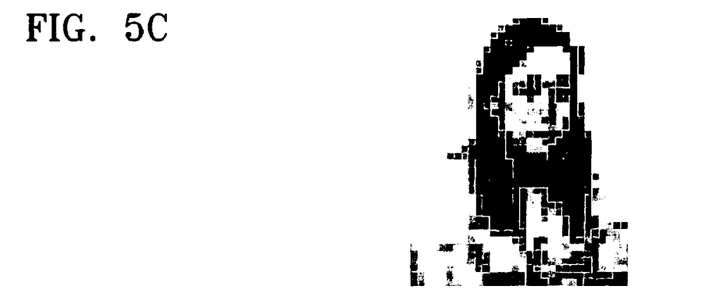
Figure 5D:
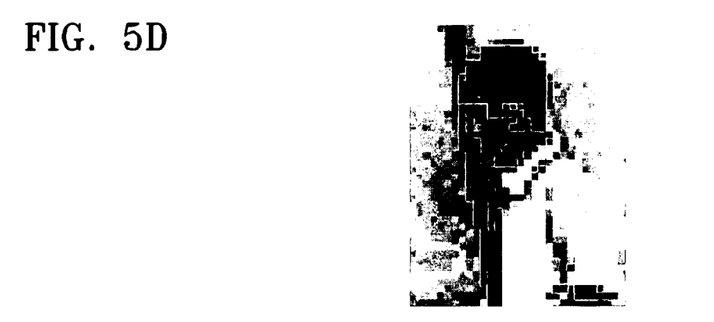

A second normalization is performed for each skin color region that is subject to the primary normalization. The second normalization is performed through bilinear interpolation. FIGS. 5B, 5C and 5D illustrate examples of the secondly normalized images.

Next, the normalized gray images are used to determine whether any of the candidate regions includes the person (operation 35). The determination is performed by applying an SVM (Support Vector Machine) to the normalized gray images. This process is described in more detail. First, a Mahalanobis distance for the normalized gray image is obtained in a block unit, each block having a size of p×q.

The average of the pixel values of each block can be obtained using equation (3).

$$\bar{x}_l = \frac{1}{pq} \sum_{(x,t) \in X_t} x_{s,t} \quad (3)$$

Here, p and q respectively denote the number of horizontal and vertical pixels for each block, $\bar{x}_l$ denotes the average of pixel values in a block, and $x_{s,t}$ denotes a pixel value included in the block.

On the other hand, a variance of each block can be expressed as equation (4).

$$\sum_i = \frac{1}{pq} \sum_{(x,t) \in X_t} (x_{s,t} - \bar{x}_l)(x_{s,t} - \bar{x}_l)^T \quad (4)$$

Here, T denotes a transpose.

Using the average and the variance of each block, the Mahalanobis distance $d_{(i,j)}$ and Mahalanobis distance map D can be obtained using equations (5) and (6), respectively.

$$d_{(i,j)} = (\bar{x}_i - \bar{x}_j)^T \left(\sum_i + \sum_j\right)^{-1} (\bar{x}_i - \bar{x}_j) \quad (5)$$

$$D = \begin{bmatrix} 0 & d_{(1,2)} & \cdots & d_{(1,MN)} \\ d_{(2,1)} & 0 & \cdots & d_{(2,MN)} \\ \vdots & \vdots & \vdots & \vdots \\ d_{(MN,1)} & d_{(MN,2)} & \cdots & 0 \end{bmatrix} \quad (6)$$

Here, M and N respectively denote the number of the horizontal and vertical blocks for the normalized gray image. If a region having a size of 30×40 in the normalized gray image is divided into blocks having a size of 5×5, the Mahalanobis distance map D becomes a 48×48 matrix.

Figure 6A:
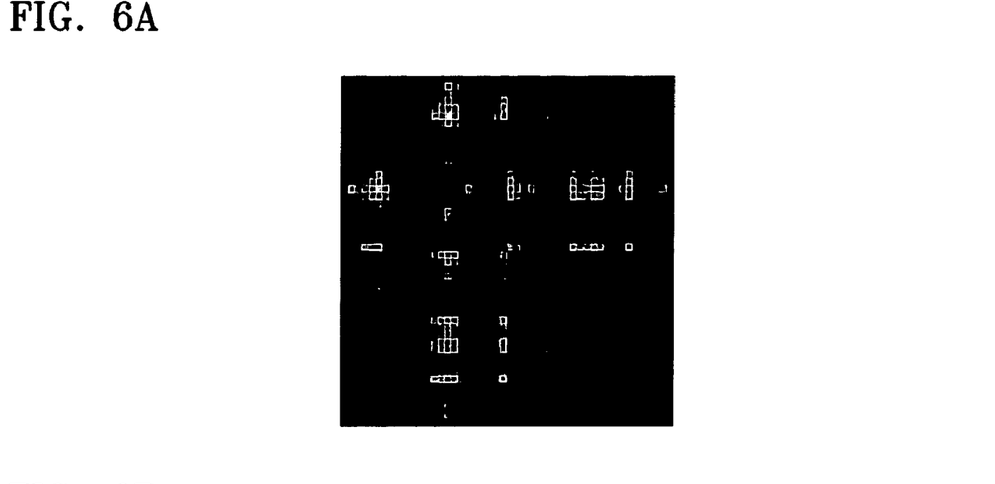
FIGS. 6A, 6B and 6C respectively show Mahalanobis distance maps for FIGS. 5B, 5C and 5D.
Figure 6B:
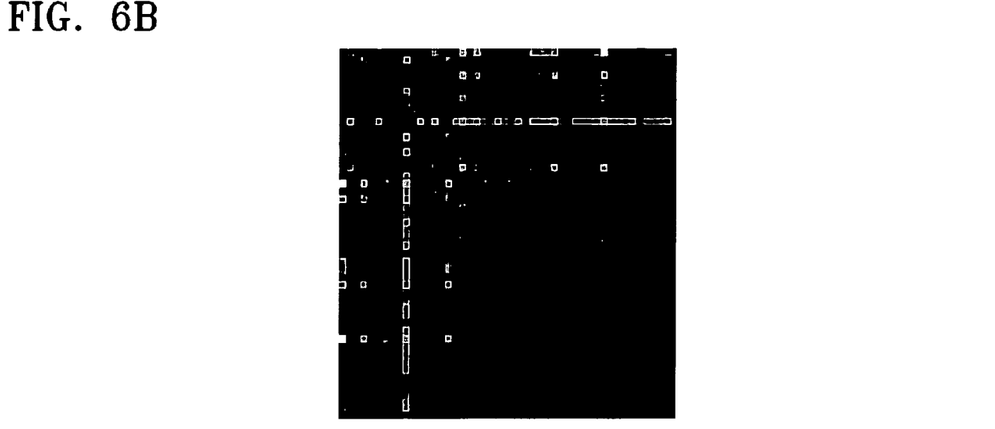
Figure 6C:
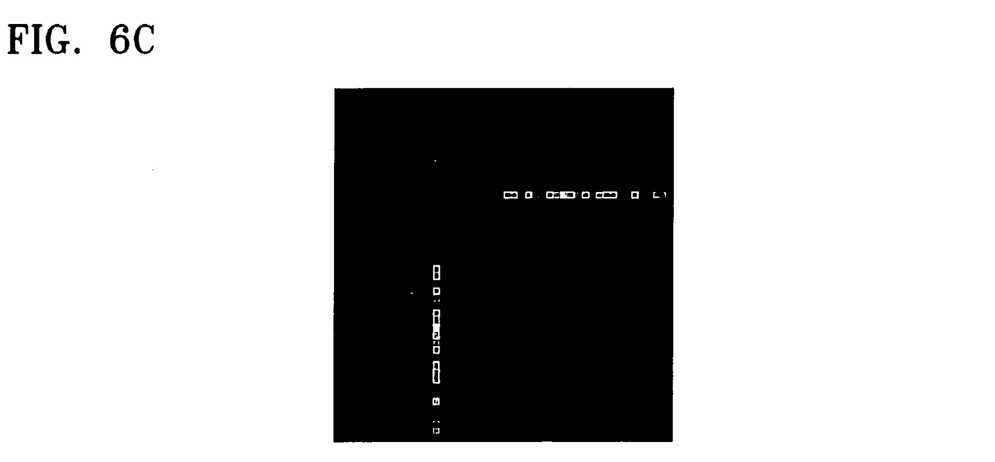

FIGS. 6A, 6B and 6C respectively show Mahalanobis distance maps for FIGS. 5B, 5C and 5D. As shown in FIGS. 6A, 6B and 6C, the gray image corresponding to the face of the person shows symmetry centered around a diagonal line from the top left corner to the bottom right corner. However, the gray image without the face of the person is not symmetrical.

Because an SVM can be trained in advance to recognize the facial image of a person, the SVM is trained to determine whether an image is the facial image of the person by obtaining the Mahalanobis distance map according to equation (6) for the image normalized on the basis of each skin color region.

Accordingly, by applying the Mahalanobis distance map obtained from the normalized gray image for the input image to the SVM, it is determined whether the image contains the person's face.

Similarity between a normalized edge image and a model image of the person is determined through obtaining a Hausdorff distance (operation 36). Here, the model image of the person means the edge image for at least one model image. One or more of the edge images of the model images may be stored where the model images contain persons facing a front side, a specified angled left side and right side.

The Hausdorff distance is obtained by calculating the Euclidean distances between every feature point of the model image and one feature point in the edge image and between one feature point of the edge image and every feature point in the model image are obtained as the following. That is, if the edge image A is composed of m feature points (pixels) and the model image B is composed of n feature points (pixels), the Hausdorff distance H(A, B) can be expressed by equation (7).

Here, $$H(A, B) = \max(h(A, B), h(B, A)) \quad (7)$$
$$h(A, B) = \max_{a \in A} \min_{b \in B} \|a - b\|$$
$$A = \{a_1, \ldots, a_m\}$$
$$B = \{b_1, \ldots, b_n\}.$$

In detail, h(A, B) is obtained by selecting the maximum value from the minimum values for m feature points (pixels) of the input edge image A where each of the minimum values is the minimum among Euclidean distances between a feature point (pixel) of the input edge image A and every feature points (pixels) of the model image B. On the contrary, h(B, A) is obtained by selecting the maximum value from the minimum values for n feature points (pixels) of the model image B where each of the minimum values is the minimum among Euclidean distances between a feature point (pixel) of the model image B and every feature points of the input edge image A. H(A, B) is determined as the maximum of h(A, B) and h(B, A). From the value of H(A, B), it can be known that how much the input edge image mismatches with the model image. The Hausdorff distances between the input model image and every model image, for example, the front model image, the left model image and the right model image are calculated, and the maximum value among the Hausdorff distances is output as a final Hausdorff distance. The final Hausdorff distance H(A, B) is compared with a specified threshold value. If the Hausdorff distance H(A, B) is less than the threshold value, the corresponding candidate region is determined to contain the person, otherwise the corresponding candidate region is determined to be the background.

Using the SVM of operation 35 and the Hausdorff distance calculating result of operation 36, the persons in the input image are finally detected (operation 37).

Figure 7A:
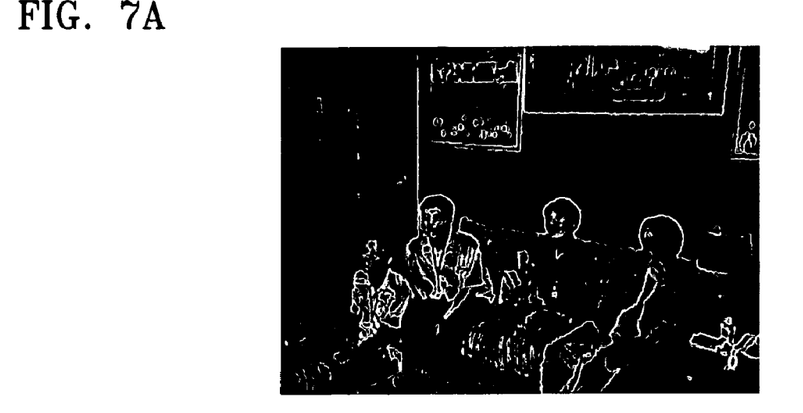
FIGS. 7A through 7D schematically illustrate a process of detecting persons from an input image.
Figure 7B:
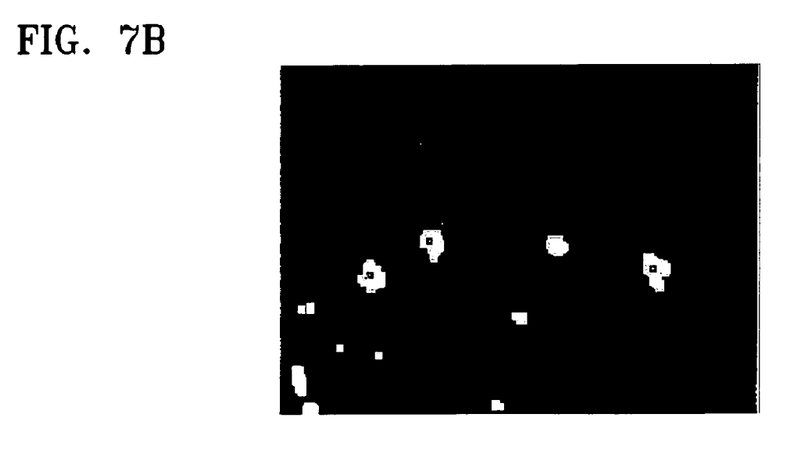
Figure 7C:
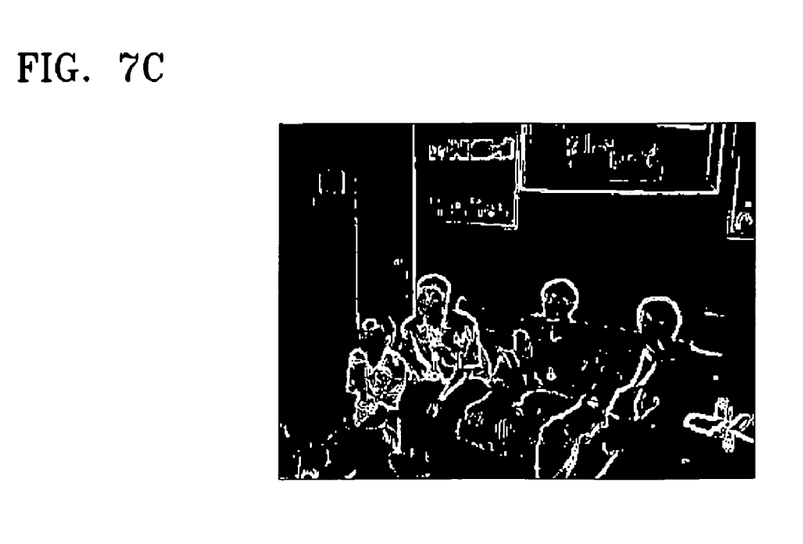
Figure 7D:
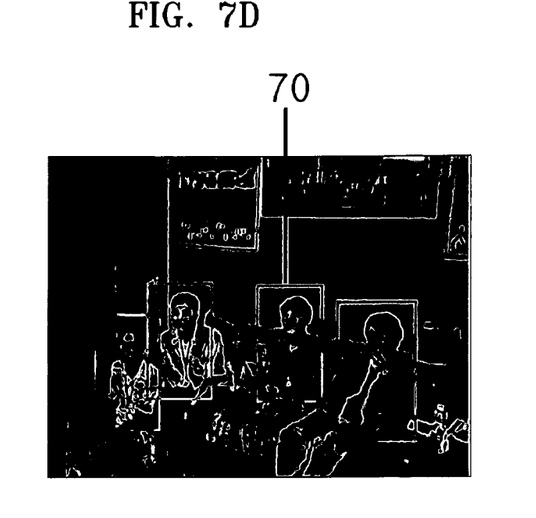

FIGS. 7A through 7D schematically exemplifies a process of detecting the persons from an input image. The color information of the input image of FIG. 7A is converted, and person candidate regions illustrated in FIG. 7B are detected from the converted color information. Also, a gray image and an edge image of FIG. 7C are obtained from the input image of FIG. 7A. In the gray image and the edge image, the normalized images having a size of 30×40 pixels are obtained for each of the detected person candidate regions. It is determined whether each of the normalized gray images contains a person using a Mahalanobis distance map and SVM. The Hausdorff distances between the normalized edge images and the model images for the front, left and right sides of the face are obtained, and compared with a threshold value to determine whether each of the normalized edge images contains a person's face. FIG. 7D illustrates the detected multiple persons.

Returning to FIG. 2, when multiple persons are detected in the input image (operation 21), the tracked object determining unit 11 of FIG. 1 determines a tracking object as follows (operation 22). First, a center value for the horizontal axis of the input image is determined. For example, if the input image has a size of 320×240, the center pixel of the horizontal axis is 160. Next, a location and an amplitude of the centroid for the detected persons are obtained. The location and the amplitude of the centroid can be obtained by averaging locations of the skin color pixels of FIG. 7B corresponding to the detected persons by the number of the skin color pixels. A person who is closest to the obtained location of the centroid in the horizontal axis of the image is determined to be an observation object. For example, among the detected persons of FIG. 7D, the person represented by a reference numeral 70 may be the observation object.

Figure 8:
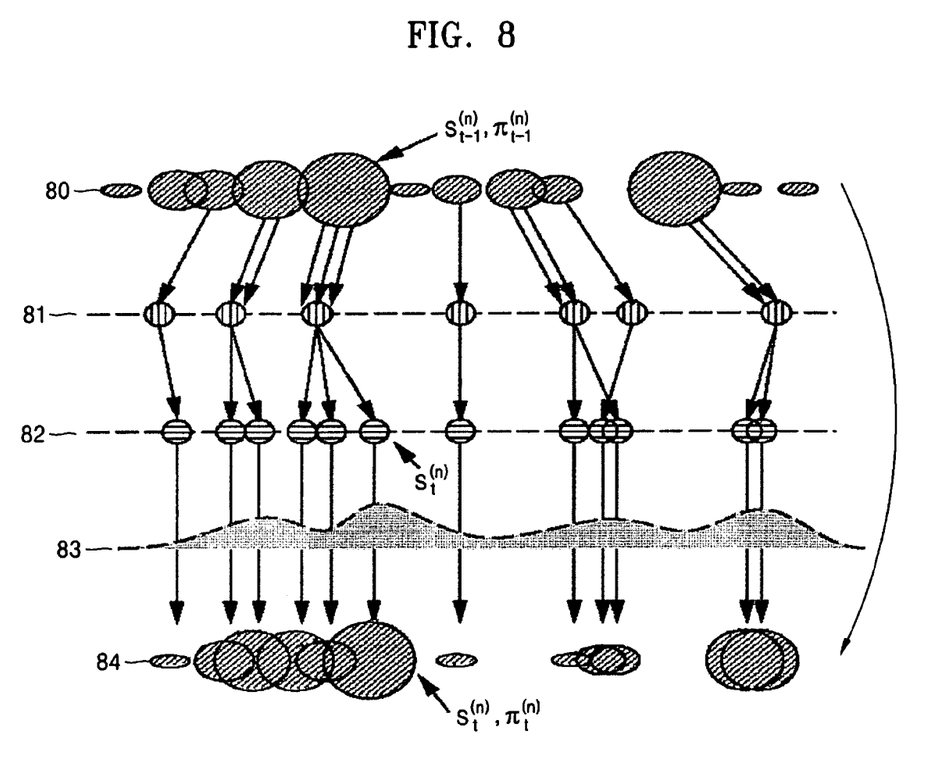
FIG. 8 is a flowchart of a particle filter method.

When the observation object is determined, the robot is moved to a certain location in the vicinity of the observation object (operation 23) and begins to track the observation object at that location (operation 24). The tracking is performed using a particle filter method as illustrated in FIG. 8.

In the tracking of the present embodiment, a location of a person for a specified measurement value can be expressed by a probability. If a sample set at time t is expressed by $\{s_t^{(n)}, n=1, \ldots, N\}$ and a weight, a state density, of a sample is expressed by $\pi_t^{(n)}$, the weighted sample set for posterior $p(x_{t-1}|Z_{t-1})$ at time (t−1) can be expressed by $\{(s_{t-1}^{(n)}, \pi_{t-1}^{(n)}), n=1, \ldots, N\}$ in operation 80. Here, $Z_{t-1}$ is a feature value measured at time (t−1). In operation 81, N samplings are performed from $\{s_{t-1}^{(n)}\}$ to generate $\{\acute{s}_t^{(n)}\}$ and the generated samples undergo drift. The sampling is performed with reference to $\pi_{t-1}^{(n)}$. That is, several samplings are performed on a sample having a high weight, and samplings may be not performed on a sample having a relatively low weight.

The drift is determined according to a specified dynamics reflecting a conditional density function $p(x_t|x_{t-1}=\acute{s}_t^{(n)})$ so that a new state of the sample is directly influenced by the previous state. The drifted samples are diffused in operation 82 so that the sample set $\{s_t^{(n)}\}$ at time t is generated. The sample value is determined by a weighted sum of a vector of the standard normal random variates and the drifted sample.

The weights of the samples are determined by each of observation densities $p(z_t|x_t)$ at each sample location as equation (8) (operation 83).

$$\pi_t^{(n)} = p(z_t \mid x_t = s_t^{(n)}) \quad (8)$$
$$\sum_n \pi_t^{(n)} = 1$$

According to the above-mentioned process, in operation 84, the weighted sample set $\{(s_t^{(n)}, \pi_t^{(n)})\}$ at time t is obtained.

In the present embodiment, the similarity based on color histogram is used as an observation feature. The similarity will be described in detail.

Figure 9A:
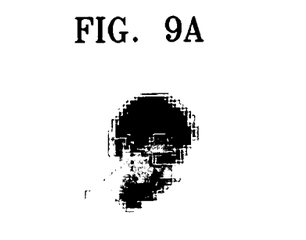
FIG. 9A illustrates a normalization window image at time (t−1) and FIG. 9B illustrates the normalization window images obtained by centering around each sample.
Figure 9B:
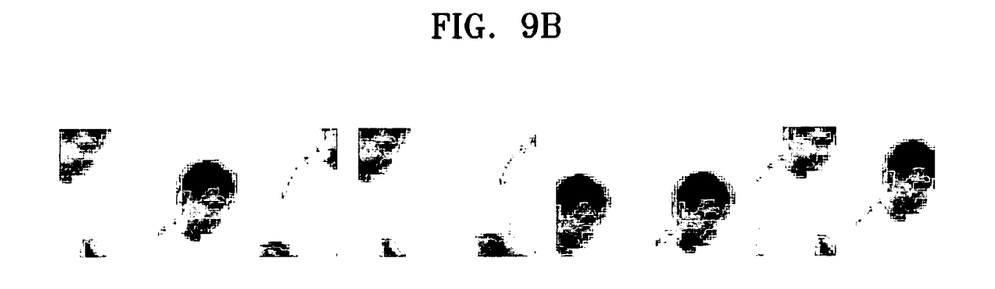

The similarity is determined by a correlation between an image $m_1$ of a normalization window at time (t−1) and an image $m_2$ of a normalization window determined by centering around each sample at time t. FIG. 9A illustrates the normalization window image at time (t−1) and FIG. 9B illustrates the normalization window image obtained by centering around each sample. The similarity between the images of FIG. 9A and FIG. 9B is calculated, and a position of a sample of the window image having a maximum similarity is determined to be a tracking location in a current frame. The similarity is determined by equation (9). The size of the normalized image is (2n+1)×(2m+1).

$$\text{likehood}(m_1, m_2) = \frac{\sum_{i=-n}^{n}\sum_{j=-m}^{m}[I_1(u_1+i, v_1+j) - \overline{I_1(u_1,v_1)}] \times [I_2(u_2+i, v_2+j) - \overline{I_2(u_2,v_2)}]}{(2n+1)(2m+1)\sqrt{\sigma^2(I_1) \times \sigma^2(I_2)}} \quad (9)$$

Here, $I_1$ and $I_2$ are color histograms of $m_1$ and $m_2$, respectively, and $(u_1,v_1)$ and $(u_2,v_2)$ are central pixel locations of $m_1$ and $m_2$, respectively.

In equation 9, an average color histogram $\overline{I_k(u,v)}$ of $m_1$ and $m_2$ and the variance thereof $\sigma(I_k)$ are calculated using equation (10).

$$\overline{I_k(u,v)} = \sum_{i=-n}^{n}\sum_{j=-m}^{m} I_k(u+i, v+j)/[(2n+1)(2m+1)] \quad (10)$$

$$\sigma(I_k) = \sqrt{\frac{\sum_{i=-n}^{n}\sum_{j=-m}^{m} I_k^2(u,v)}{(2n+1)\times(2m+1)} - \overline{I_k(u,v)}}$$

Next, a CDF of the current sample is obtained and operations 80 through 84 for the next frame are repeated.

Figure 10:
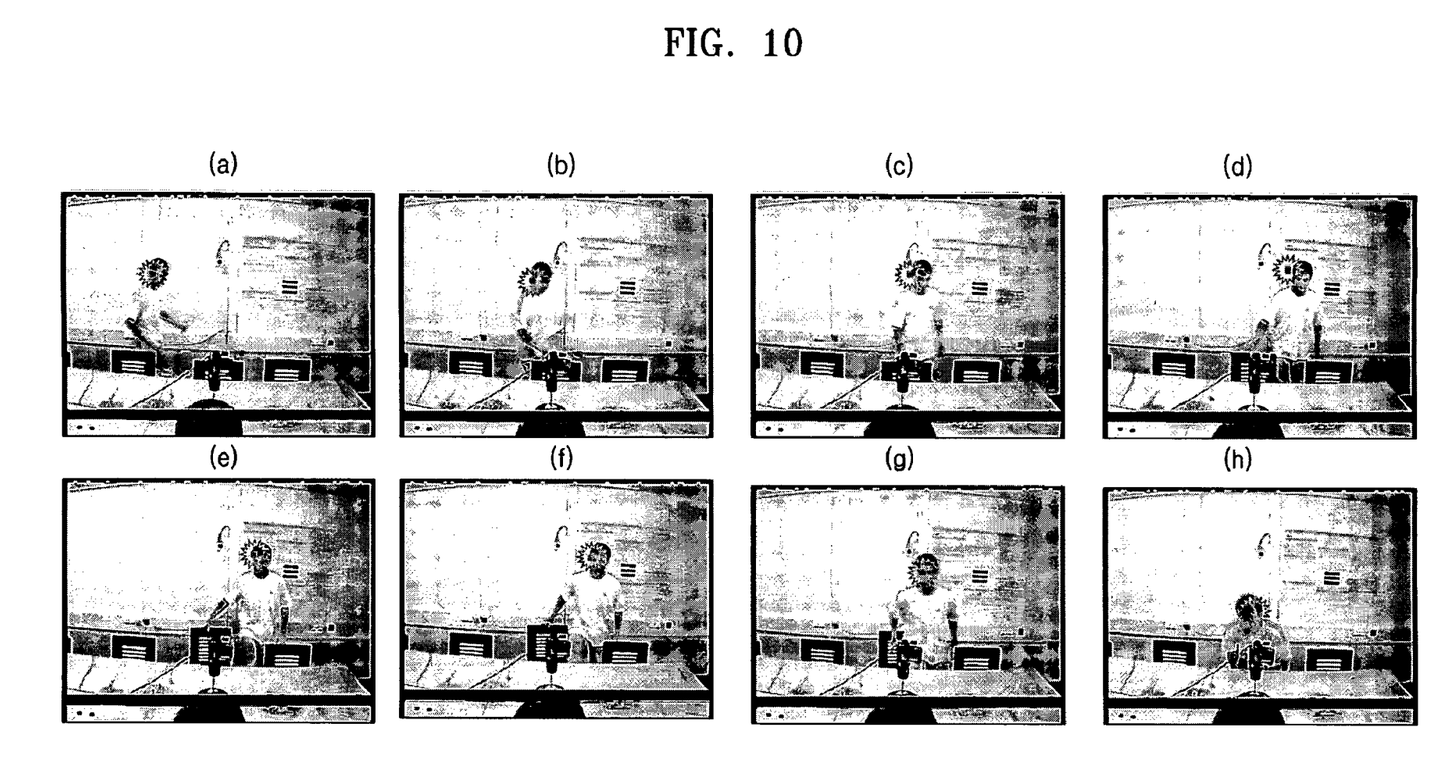
FIG. 10, parts (a)-(h), illustrates a process of tracking a moving person.

Parts (a)-(h) of FIG. 10 illustrate a process of tracking a person who walks to and sits on a chair. As shown in FIG. 10, the person tracking is performed well.

The above-described embodiments of the present invention can also be embodied as computer-readable code on a computer-readable storage medium. A computer-readable storage medium is any data storage device that can store data which can be thereafter read by a computer system. Examples of a computer-readable storage medium include read-only memory (ROM), random-access memory (RAM), CD-ROMs, magnetic tapes, floppy disks, optical data storage devices, and carrier waves (such as data transmission through the internet). The computer-readable storage medium can also be distributed over network coupled computer systems so that the computer readable code is stored and executed in a distributed fashion.

According to the above-described embodiments of the present invention, a person can be detected and tracked, regardless of the facing direction of the person, by detecting persons from an image using the skin color and shape information of the persons, determining a tracking object, and tracking the tracking object using the color histogram information.

Furthermore, using the correlation between the normalized image of the previous frame and the normalized images centered around each sample, a motion of the person can easily be detected.

The above-described embodiments of the present invention can continuously track and monitor a determined person. Accordingly, since pictures can be taken continuously while tracking the specified specific person, the present invention can be applied to an unmanned camera of a broadcasting station.

Moreover, the intelligence of household electric appliances can be accomplished using the location and distance information of the person.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

What is claimed is:

1. A person tracking method comprising:
   detecting a person in a first window of a current input image using a skin color of the person; and
   setting a plurality of second windows in a next input image having a temporal delay from the current input image, correlating the first window and the second windows and tracking the detected person in the next input image using the correlated results,
   wherein the method is performed using a computer system, and
   wherein the second windows are set in the next input image centered around the locations of first samples selected in the next input image according to a particle filter.

2. The person tracking method as claimed in claim 1, wherein the second windows are set to a size equal to that of the first window in the next input image.

3. The person tracking method as claimed in claim 2, wherein selecting the first samples comprises:
   sampling the first samples in the next input image based on weights of second samples included in the first window; and
   drifting the first samples based on locations of the second samples and determining locations of the first samples based on drafted locations of the first samples.

4. The person tracking method as claimed in claim 1, wherein the correlation is calculated by an equation $$\text{similarity}(m_1, m_2) = \frac{\sum_{i=-n}^{n}\sum_{j=-m}^{m}[I_1(u_1+i, v_1+j) - \overline{I_1(u_1,v_1)}] \times [I_2(u_2+i, v_2+j) - \overline{I_2(u_2,v_2)}]}{(2n+1)(2m+1)\sqrt{\sigma^2(I_1) \times \sigma^2(I_2)}}, \text{ and}$$

wherein $I_1$ and $I_2$ are color histograms of the first window and the second window, respectively, $(u_1,v_1)$, $(u_2,v_2)$ are central pixel locations of the first window and the second window, respectively, and $(2n+1)\times(2m+1)$ is a size of the first window or the second window.

5. The person tracking method as claimed in claim 1, further comprising:
obtaining a horizontal center of the current input image, when multiple persons are detected in detecting the person; and
determining as a tracking object a person closest to the horizontal center among the detected persons.

6. The person tracking method as claimed in claim 1, wherein the detecting the person comprises:
detecting at least one skin color region using skin color information for the current input image;
determining whether each detected skin color region corresponds to a person candidate region; and
determining whether each detected skin color region that is determined to be the person candidate region matches the person using shape information of the person.

7. The person tracking method as claimed in claim 6, wherein detecting the at least one skin color region comprises:
normalizing colors of each pixel of the current input image;
performing a Gaussian modeling for the normalized image to emphasize pixels of a color similar to the skin color; and
binarizing pixels whose modeled values are greater than a specified threshold value among the emphasized pixels to detect the at least one skin color region.

8. The person tracking method as claimed in claim 6, wherein determining whether each detected skin color region corresponds to the person candidate region comprises:
normalizing a size of each detected skin color region to a size of the first window; and
determining whether each normalized skin color region is the person candidate region.

9. The person tracking method as claimed in claim 8, wherein determining whether each normalized skin color region is the person candidate region comprises:

obtaining a gray image for the first window;
dividing the gray image into a plurality of blocks and obtaining Mahalanobis distances between the blocks to generate a Mahalanobis distance map; and
determining whether each normalized skin color region is the person candidate region using the generated Mahalanobis distance map.

10. The person tracking method as claimed in claim 8, wherein determining whether each normalized skin color region is the person candidate region comprises:
obtaining an edge image for the first window;
obtaining a similarity between the obtained edge image and edge images of model images; and
determining whether each normalized skin color region is a person candidate region according to the similarity.

11. The person tracking method as claimed in claim 10, wherein the similarity is measured by a Hausdorff distance.

12. The person tracking method as claimed in claim 10, wherein the model images include at least one of a front model image, a left model image, and a right model image.

13. A computer-readable storage medium encoded with processing instructions for causing a processor to perform a person tracking method, the method comprising:
detecting a person in a first window of a current input image using a skin color of the person; and
setting a plurality of second windows in a next input image having a temporal delay from the current input image, correlating the first window and the second windows and tracking the detected person in the next input image using the results,
wherein the second windows are set in the next input image centered around the locations of first samples selected in the next input image according to a particle filter.

14. A person tracking apparatus comprising:
an image input unit which outputs continuous images;
a person detecting unit which detects a person from a current input image in a first window using a skin color of the person; and
a tracking unit which sets a plurality of second windows in a next input image following the current input image with a temporal delay, correlates the first window and the second windows and tracks the detected person in the next input image using the correlated results,
wherein the second windows are set in the next input image centered around the locations of first samples selected in the next input image according to a particle filter.

15. The person tracking apparatus as claimed in claim 14, wherein the second windows are set to a size equal to that of the first window in the next input image centered on the locations of the first samples selected in the next input image.

16. The person tracking apparatus as claimed in claim 15, wherein the first samples are selected from second samples included in the first window using a particle filter.

17. The person tracking apparatus as claimed in claim 14, wherein the correlation is calculated by an equation $$\text{similarity}(m_1, m_2) = \frac{\sum_{i=-n}^{n}\sum_{i=-m}^{m}[I_1(u_1+i, v_1+j) - \overline{I_1(u_1, v_1)}] \times [I_2(u_2+i, v_2+j) - \overline{I_2(u_2, v_2)}]}{(2n+1)(2m+1)\sqrt{\sigma^2(I_1)\times\sigma^2(I_2)}},$$

and
wherein $I_1$ and $I_2$ are color histograms of the first window and the second window, respectively, $(u_1,v_1)$, $(u_2,v_2)$ are central pixel locations of the first window and the second window, respectively, and $(2n+1)\times(2m+1)$ is a size of the first window or the second window.

18. The person tracking apparatus as claimed in claim 14, further comprising:
a tracking object determining unit which obtains a horizontal center of the current input image; and determines as a tracking object a person closest to the center among the detected persons, when multiple persons are detected by the person detecting unit.

* * * * *

UNITED STATES PATENT AND TRADEMARK OFFICE
CERTIFICATE OF CORRECTION

PATENT NO. : 7,668,338 B2
APPLICATION NO. : 11/207713
DATED : February 23, 2010
INVENTOR(S) : Sangmin Yoon It is certified that error appears in the above-identified patent and that said Letters Patent is hereby corrected as shown below:

Column 10, Line 15, change "the result," to --the correlated results,--.

Signed and Sealed this

Eighteenth Day of May, 2010

David J. Kappos
*Director of the United States Patent and Trademark Office*